Sept. 1, 1931.  J. ROBINSON  1,821,033
RADIO RECEIVING APPARATUS
Filed July 15, 1930
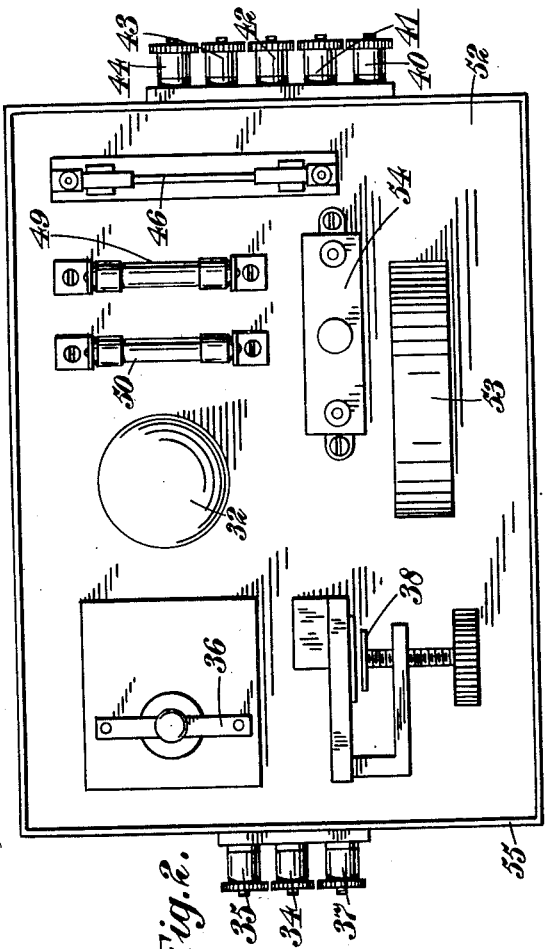
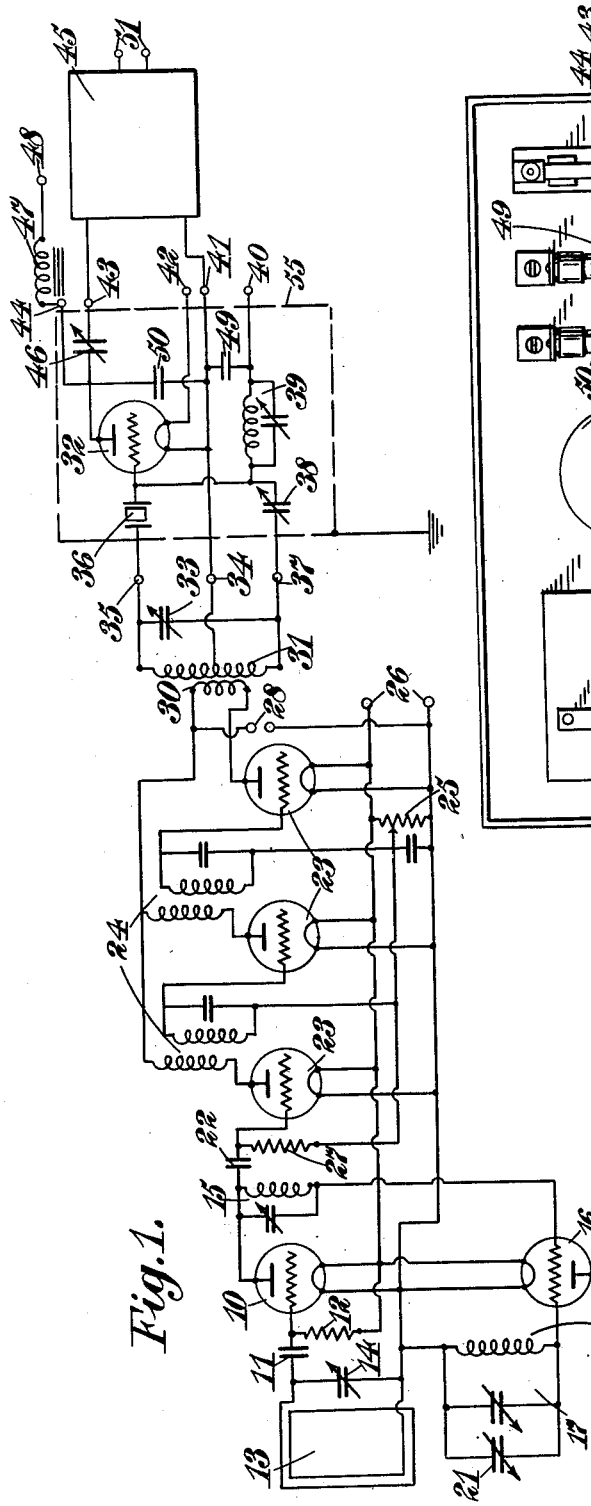

Patented Sept. 1, 1931

1,821,033

UNITED STATES PATENT OFFICE

JAMES ROBINSON, OF LONDON, ENGLAND

RADIO RECEIVING APPARATUS

Application filed July 15, 1930, Serial No. 468,142, and in Great Britain July 26, 1929.

This invention is for improvements in or relating to wave-signalling systems, and is primarily concerned with the transmission and reception of modulated or interrupted wave-energy such as wireless telephony and telegraphy.

One object of the invention is to provide a receiver which is much more selective than has been contemplated heretofore with due regard for faithful reproduction of the signals such as telephony, music, and television.

The selectivity of a receiver is usually shown in the form of a curve of which the abscissæ denote the frequency-difference, both positive and negative, from the resonant frequency of the receiver, and the ordinates denote the magnitude of the response obtained when the frequency of unmodulated applied energy is changed to the values given by the abscissæ. The amplitude diminishes with increase of frequency-difference until the response is not an effective or useful one and the band between these positive and negative effective limits may be termed the effective width of the resonance or selectivity curve of the receiver.

Since the diminution of response is gradual, and with any known receiver there is not a sharply defined cut-off, and since the audibility of a telephony interference depends on various factors including the relative strengths of the wanted and interfering signals, and the hearing ability of a normal human ear, the words "no effective response" and "no response" are used in this specification to indicate that the interference from a normally modulated transmission (e. g. a broadcasting station) is negligibly small to a normal individual when the wanted and the interfering signals are of comparable field strength.

It has heretofore been considered that when a carrier-wave is modulated by another wave, the receiver should be uniformly responsive to the carrier-wave and to frequencies equal, respectively, to the sum and difference of the carrier-frequency and modulation-frequency, these latter being known as side-band-frequencies. The range of modulation-frequencies, therefore, determines the extent of the side-band frequencies associated with a transmission. In the case of telephony, experience has shown that a range extending at least 5,000 cycles from the carrier is required for tolerably good or satisfactory reproduction, and in the case of telegraphy the side-band-frequencies must include the dot-frequency and such harmonics thereof as are necessary to give the desired signal-shape. In this specification, therefore, the words "highest modulation frequency" are used to mean the highest modulation frequency that is considered necessary for the tolerably good or satisfactory reproduction of the signals, as distinct from such higher frequencies as may be present, but whose absence from the received signal is not noticeable.

For the above reason, transmitting stations which are liable to interfere with one another have hitherto been arranged to operate on carrier-frequencies spaced apart at least sufficiently to accommodate separately the range of side-bands of each transmission (for example, a spacing of 10,000 cycles for broadcast telephony provides for two modulation ranges each of 5,000 cycles), and the receivers have been designed to give a substantially uniform response over all the side-bands of that type of transmission.

Receiving apparatus as hitherto made has been such that if two transmissions had their carriers spaced apart less than the sum of their two ranges of side-band-frequencies, interference was inevitably obtained, and I considered that this interference was primarily due to the lack of selectivity of the receiver and not necessarily to the effects of modulation (or side-bands) of the carrier-wave. I have now found that the selectivity of receivers may be increased up to the utmost possible degree so as to exclude interfering signals while still receiving all the desired modulations of wanted signals, and it is thereby possible to arrange the transmitting stations at a closer spacing of their carrier waves than has hitherto been considered possible so that it is now possible to provide a large number of additional transmission channels.

It has been proposed to use piezo-electric crystals in receivers to obtain a high degree of selectivity, but, owing to the persistence of the signals arising from the low damping of such receiver, although these receivers might operate in special cases such as very low speed telegraphy, they are useless for telephony, high speed telegraphy, or television.

Further, in some cases in attempts to improve selectivity to a small degree, the effect obtained was that the response for receiver energy equivalent to the higher modulation frequencies was low compared with the response at the resonant frequency, and therefore a greater amplification of the high tones than of the low tones was provided in order to balance up the audio frequency effects. Such receivers were, however, susceptible to interference at frequencies within the band of, say, 10,000 cycles for which they were intended to operate, and therefore it appeared that there was no advantage to be obtained by increasing the selectivity further, since to remove the interference would also result in removing the energy at frequencies believed to be required for good reproduction of the signals.

The present invention accordingly comprises a wave-signalling system wherein there is employed a receiver tuned for the carrier-wave of a wanted signal and having such high selectivity and/or low damping that there is no response to interfering signals whereof the carrier-frequency lies outside the response-curve of the receiver but differs from the frequency of the wanted carrier-wave by an amount less than the highest modulation-frequency of the wanted signal, while modulations of the carrier-wave of the wanted signal corresponding to its whole modulation-range are faithfully reproduced by the aid of means for correcting the inherent signal-distortion due to the high selectivity of the receiver.

This invention also comprises a wave-signalling system wherein there is employed a receiver tuned for the carrier-wave of a wanted signal and having such high selectivity and/or low damping that there is no response to interfering modulated signals whereof the side-band-frequencies (as hereinbefore defined) differ from the frequency of the wanted carrier-wave by an amount less than the highest modulation-frequency of the wanted signal, while modulations of the carrier-wave of the wanted signal corresponding to its whole modulation-range are faithfully reproduced by the aid of means for correcting the inherent signal-distortion due to the high selectivity of the receiver.

This invention still further comprises receiving apparatus having high selectivity and/or low damping suitable for use in the systems above set forth. In a specific example the receiver may be such that a response of 25% or more of the maximum response is obtained only within a frequency band of two kilocycles, that is to say, one kilocycle on each side of its resonant frequency.

One explanation which may be given for the satisfactory operation of the very selective receivers according to the present invention is as follows:

The rate of building up or dying down of the energy in the resonant portion of the receiver when receiving a modulated carrier-wave transmission (assuming that the applied signals are of uniform strength) depends on the damping of the resonant portion, and the extent to which the oscillations build up depends, therefore, on the duration of the applied signal. The signal pulses of the carrier-wave have a longer duration in the case of a low-note modulation than a high-note modulation, and consequently, owing to this time difference, the energy produced in the receiver will build up to a greater extent for the lower frequency of variation. Thus, the amplitude variation of the ultimate signal response is greater for a low note than for a high note. All the modulation effects are thus received, but do not produce a uniform response. It can be shown that for a single circuit of very low damping, such for example as a piezo crystal, the amplitude of the signal response is inversely proportional to the frequency of the signal modulation. For series circuits the extent of alteration of the relative amplitude of the modulation frequencies is dependent upon the number of such circuits employed. In the receiver according to the invention this is subsequently corrected.

The receiver may have such means as one or more piezo-electric devices or other mechanical resonators, or a plurality of tuned circuits coupled in cascade, or combinations of these to provide high selectivity.

It is a more specific object of the invention to provide a highly selective receiver as generally described hereinbefore, which by the use of superheterodyne arrangements, can be tuned to transmissions differing as regards the fundamental or carrier frequency throughout a wide range of frequencies.

Thus is it possible by the use of highly selective receiving apparatus constructed in accordance with the principles outlined herein, to receive individually, and without interference, any desired one of a plurality of transmissions on fundamental or carrier frequencies which are much more closely related as regards frequency than is possible for satisfactory reception with known receiving apparatus.

One embodiment of a radio receiver according to the invention is shown by way of example in the accompanying drawings, in which:—

Figure 1 is a general diagram of the radio receiver, and

Figure 2 is a diagrammatic plan showing the arrangement of parts in one section of the receiver.

Referring to the drawings, the receiver comprises a thermionic valve 10 provided with a grid condenser 11 and resistance 12 to operate as a detector and coupled to a frame aerial 13 tuned by a variable condenser 14. The output circuit of the valve 10 contains a tuned circuit 15 that is connected to the grid of a valve oscillator 16 which latter has a tuned grid circuit 17 and an anode coupling coil 18, the anode direct current supply being applied at the terminal 19 with the usual bye-pass condenser 20. In parallel with the tuned circuit 17 there is provided an additional variable condenser of any small capacity 21 for example 10 micro microfarads maximum, to facilitate tuning of the receiver in view of its very high selectivity. The anode of the valve 10 is coupled through a condenser 22 to the grid of the first of three intermediate frequency amplifying valves 23 having tuned couplings, indicated at 24. The grids of the valves 23 obtain their operating potential from a potentiometer 25 connected across the terminals 26 for the filament battery, the potential for the first valve 23 being applied through a resistance 27. The anode direct current supply for the valves 23 is applied at the terminals 28.

The anode of the last valve 23 of the intermediate frequency amplifier contains a coil 30 variably coupled to another coil 31 which is connected to a second detector valve 32 through a highly selective device as hereinafter described. The coil 31 which is tuned by a variable condenser 33 has a centre tapping connected by way of terminal 34 to the filament of the valve 32. One end of the coil 31 is connected through terminal 35 to a piezo-electric device 36 in series with the grid of the valve 32 and the other end is connected through terminal 37 to a small variable condenser 38 also connected to the grid of the valve 32. The piezo-electric device 36 which has a resonant frequency corresponding to that of the intermediate frequency amplifier provides a high order of selectivity for the receiver and any interference effects due for instance to the inherent capacity of the piezo-electric device are balanced out by means of the variable condenser 38. A tuned circuit 39 forms a leak for the grid of the valve 32 and a suitable biasing potential is applied to the terminals 40 and 41, a bye-pass condenser 49 being provided as shown. The nature of the biasing potential required will in general be much more negative than is usually the case with detectors in normally selective receivers.

Owing to the high selectivity of the receiver, there is a disproportionate treatment of the signal frequencies in that the lower signal frequencies are more strongly received than the higher signal frequencies. In consequence of this the detector valve is coupled to a final amplifier indicated at 45 and having output terminals 51 through a distortion-correcting device consisting of a choke-capacity coupling, of which the condenser 46 (which is preferably adjustable) is of such value as to effect the necessary disproportionate treatment of the signal frequencies. The condenser 46 is connected between the anode of the valve 32 and the terminal 43 for the amplifier 45 and the choke 47 is also connected to the anode of the valve by way of the terminal 44, the direct current supply being applied at the terminal 48. A bye-pass condenser 50 is provided for intermediate frequency currents and the filament battery for the valve 32 is applied to the terminals 41 and 42.

In order to prevent stray effects it is preferable to screen the highly selective device comprising the piezo-electric device 36 and associated parts and in Figure 2 there is shown in plan a suitable arrangement of these parts with the screen. In this figure the piezo-electric device indicated at 36 is located on the left-hand side of a base 52, and the small variable condenser 38 is arranged by the side of the piezo-electric device. The bye-pass condensers 49 are arranged towards the right-hand side of the base 52, and between these condensers and the piezo-electric device 36 the valve 32 is arranged. The coil and condenser of the tuned circuit 39 are shown resepectively at 53 and 54 and the distortion-correcting condenser 46 here shown is of the interchangeable plug-in type. This assembly is enclosed within a metal casing 55 which is connected to earth. The input terminals 34, 35 and 37 are provided upon the exterior of the casing at the left hand side and the output terminals 40 to 44 are provided on the right hand side.

I claim:—

1. A receiver for wave signals including a resonant circuit for wanted incoming signal energy, such as is constituted by a modulated carrier wave, a local generator of oscillations of variable frequency to combine with the incoming energy to produce energy of a constant frequency, a resonant device for this constant frequency energy, said resonant device having such high selectivity that the receiver provides no response to interfering signals whereof the carrier frequency of such interfering signals lies outside the resonance curve of the receiver, but differs from the wanted carrier wave by an amount less than the highest modulation frequency of the wanted signal, whereby the amplitude of wave-form energy corresponding to different modulation frequencies is varied; yet modulations of the carrier wave of the wanted signal corresponding to the whole of the required modulation range may be reproduced, and means for altering the amplitude of wave-form energy corresponding to different modulation frequencies in the opposite sense.

2. A receiver for wave signals including a resonant circuit for wanted incoming signal energy, such as is constituted by a modulated carrier wave, a local generator of oscillations of variable frequency to combine with the incoming energy to produce energy of a constant frequency, a mechanical resonator for this constant frequency energy, said mechanical resonator having such high selectivity that the receiver provides no response to interfering signals whereof the carrier frequency of such interfering signals lies outside the resonance curve of the receiver, but differs from the wanted carrier wave by an amount less than the highest modulation frequency of the wanted signal, whereby the amplitude of wave-form energy corresponding to different modulation frequencies is varied, yet modulations of the carrier wave of the wanted signal corresponding to the whole of the required modulation range may be reproduced, means for converting the signal energy at said constant frequency to reproduce the wanted modulated signals, and means for altering the amplitude of wave-form energy corresponding to different modulation frequencies in the opposite sense.

3. A receiver for wave signals comprising a resonant circuit for wanted incoming signal energy, such as is constituted by a modulated carrier wave, a local generator of oscillations of variable frequency to combine with the incoming energy to produce energy of a constant frequency, a resonant device for this constant frequency energy, said resonant device having such high selectivity that the receiver provides no response to interfering modulated signals whereof the side band frequencies of such interfering signals differ from the frequency of the wanted carrier wave by an amount less than the highest modulation frequency of the wanted signal, whereby the amplitude of wave-form energy corresponding to different modulation frequencies is varied, yet modulations of the carrier wave of the wanted signal corresponding to the whole of the required modulation range may be reproduced, in combination with means for altering the amplitude of wave-form energy corresponding to different modulation frequencies in the opposite sense.

4. A receiver for wave signals comprising a resonant circuit for wanted incoming signal energy, such as is constituted by a modulated carrier wave, a local generator of oscillations of variable frequency to combine with the incoming energy to produce energy of a constant frequency, a resonant device for this constant frequency energy, said resonant device having such high selectivity that the receiver provides no response to interfering modulated signals whereof the difference between the carrier wave frequencies of the wanted and interfering signals is less than the sum of the highest modulation frequencies of both signals, whereby the amplitude of wave-form energy corresponding to different modulation frequencies is varied, yet modulations of the carrier wave of the wanted signal corresponding to the whole of the required modulation range may be reproduced in intensity varying with the frequency thereof, in combination with means for altering the amplitude of wave-form energy corresponding to different modulation frequencies in the opposite sense.

5. A receiver for wave signals including a resonant circuit for wanted incoming signal energy, such as is constituted by a modulated carrier wave, a local generator of oscillations of variable frequency to combine with the incoming energy to produce energy of a constant frequency, resonant means including a piezo-electric device for transmitting the constant frequency energy therethrough, said resonant means having such high selectivity that the receiver provides no response to interfering signals whereof the carrier frequency of such interfering signals lies outside the resonance curve of the receiver, but differs from the wanted carrier wave by an amount less than the highest modulation frequency of the wanted signal, whereby the amplitude of wave-form energy corresponding to different modulation frequencies is varied, yet modulations of the carrier wave of the wanted signal corresponding to the whole of the required modulation range may be reproduced, and means for altering the amplitude of wave-form energy corresponding to different modulation frequencies in the opposite sense.

6. A receiver for wave signals comprising a resonant circuit for wanted incoming signal energy, such as is constituted by a modulated carrier wave, a local generator of oscillations of variable frequency to combine with the incoming energy to produce energy of a constant frequency, resonant means including a piezo-electric device for transmitting the constant frequency energy therethrough, whereby the amplitude of wave-form energy corresponding to different modulation frequencies is relatively altered substantially throughout the entire range of such frequencies, and means for altering the amplitude of energy corresponding to different modulation frequencies in the opposite sense.

7. A receiver for wave signals comprising a resonant circuit for wanted incoming signal energy, such as is constituted by a modulated carrier wave, a local generator of oscillations of variable frequency to combine with the incoming energy to produce energy of a constant frequency, resonant means including a piezo-electric device for transmitting the constant frequency energy therethrough, whereby the amplitude of waveform energy corresponding to different modulation frequencies is varied substantially in inverse proportion to the frequency value, and means for varying the amplitude of waveform energy corresponding to the different modulation frequencies substantially in proportion to the frequency values.

8. A receiver for wave signals comprising a resonant circuit for wanted incoming signal energy, such as is constituted by a modulated carrier wave, a local generator of oscillations of variable frequency to combine with the incoming energy to produce energy of a constant frequency, resonant means including a piezo-electric device for transmitting the constant frequency energy therethrough, whereby the amplitude of wave-form energy corresponding to different modulation frequencies is relatively altered substantially throughout the entire range of such frequencies, a detector to which the energy transmitted through said piezo-electric device is supplied, and an amplifier associated with said detector including means for altering the amplitude of the wave-form energy corresponding to different modulation frequencies in the opposite sense.

In testimony whereof I affix my signature.

JAMES ROBINSON.